United States Patent [19]
Otaki et al.

[11] Patent Number: 5,880,455
[45] Date of Patent: Mar. 9, 1999

[54] FOCAL POSITION DETECTION APPARATUS HAVING A LIGHT REFLECTING MEMBER WITH PLURAL REFLECTING FILMS

[75] Inventors: Tatsuro Otaki, Tokyo; Jun Matsuno, Zushi, both of Japan

[73] Assignee: Nikon Corporation, Tokyo, Japan

[21] Appl. No.: 906,821

[22] Filed: Aug. 6, 1997

Related U.S. Application Data

[63] Continuation-in-part of Ser. No. 694,253, Aug. 8, 1996, abandoned.

[30] Foreign Application Priority Data

Aug. 8, 1995 [JP] Japan .................................. 7-222678

[51] Int. Cl.$^6$ ...................................................... G01J 1/20
[52] U.S. Cl. ...................... 250/201.8; 250/216; 359/556; 396/82
[58] Field of Search .............................. 250/201.8, 207.7, 250/207.5, 201.4, 559.29, 559.32, 216, 225, 208.1; 359/555–557, 205, 209, 212; 396/79, 55, 82, 120, 121

[56] References Cited

U.S. PATENT DOCUMENTS

| | | | |
|---|---|---|---|
| 4,831,276 | 5/1989 | Hyakumura | 250/225 |
| 4,912,496 | 3/1990 | Tamada et al. | 250/201.4 |
| 5,783,818 | 7/1998 | Manabe et al. | 250/216 |

*Primary Examiner*—Que T. Le
*Attorney, Agent, or Firm*—Foley & Lardner

[57] ABSTRACT

This invention relates to a focal position detection apparatus for detecting a positional shift between the imaging position of an object image formed by a predetermined objective optical system and the detection surface of the object image. This apparatus includes a beam splitter for extracting part of a light beam from the objective optical system, splitting the light beam into at least three light beams, and guiding the split light beams to the light-receiving surface of a photosensing device arranged at a predetermined position. This beam splitter guides at least the three split light beams to a standard optical path and a pair of reference optical path and forms a standard image at a predetermined position in the standard optical path and a pair of reference images at predetermined positions in the pair of optical paths, respectively. The imaging positions of the pair of reference images are shifted from each other in opposite direction with respect to the imaging surface on which the standard image is formed. The apparatus detects a positional shift by using the optically symmetry of at least one pair of reference images in a focusing state with respect to the standard image.

26 Claims, 7 Drawing Sheets

A : INTEGRATION VALUE ASSOCIATED WITH FIRST REFERENCE IMAGE

B : INTEGRATION VALUE ASSOCIATED WITH STANDARD IMAGE

C : INTEGRATION VALUE ASSOCIATED WITH SECOND REFERENCE IMAGE

D : INTEGRATION VALUE

FOCAL POSITION DETECTION APPARATUS HAVING A LIGHT REFLECTING MEMBER WITH PLURAL REFLECTING FILMS

RELATED APPLICATIONS

This is a Continuation-In-Part application of application Ser. No. 08/694,253 filed on Aug. 8, 1996, now abandoned.

BACKGROUND OF THE INVENTION

1. Field of the Invention

The present invention relates to a focal position detection apparatus applicable to the auto-focusing mechanism of an optical equipment such as a microscope, a still camera, a video camera, or the like.

2. Related Background Art

In an optical equipment such as a microscope, a still camera, or a video camera, an object image is formed on a predetermined detection surface through an objective optical system, and the formed image is picked up using an image pickup element such as a CCD, a film, or the like. Such optical equipment has an auto-focusing mechanism to photograph a sharp object image. An important portion of the auto-focusing mechanism is a focal position detection apparatus for detecting a positional shift between the imaging plane (focal position) of the objective optical system and the image pickup surface (image detection surface) of the image pickup device.

SUMMARY OF THE INVENTION

It is an object of the present invention to obtain a highly reliable focal position detection apparatus which avoids erroneous detection of a focusing state when a large shift is generated between the imaging position of an object image formed by an objective optical system and the image detection surface of an image pickup device such as a CCD, a film, or the like, i.e., when the focal position shifts by a large amount. This focal position detection apparatus is applied to the main portion of the auto-focusing mechanism of an optical equipment such as a microscope, a still camera, a video camera, or the like.

A focal position detection apparatus according to the present invention is an apparatus for detecting a positional shift between the imaging position of an object image to be formed by an objective optical system and the image detection surface of the object image. More specifically, as shown in FIG. 1, the apparatus comprises a beam splitter 3 (first beam splitter) arranged in an optical path between the objective optical system (including objective 1) and a detection surface 2 of the image pickup device to extract part of a light beam from the objective 1, and a photo-sensing device 120 for detecting a light beam extracted by the beam splitter 3, and a prism assembly 8 (second beam splitter) for splitting the light beam extracted by the beam splitter 3 into a standard light beam and at least one pair of reference light beams (including a first reference light beam and a second reference light beam) and guiding the standard light beam and at least the pair of reference light beams to the light-receiving surface 12 of the photo-sensing device 120. The prism assembly 8 defines a standard optical path through which the standard light travels and a pair of reference optical paths (including a first reference optical path and a second reference optical path) through which the first and second reference light beams travel respectively and forms a standard image 11b at a predetermined position in the standard optical path and a first reference image 11a and a second reference image 11c at predetermined positions in the pair of reference optical paths. The objective of the specification may includes a refractive element as shown in FIG. 1, a reflective element, a combination of these elements, or the like.

In particular, the first and second reference images 11a and 11c are formed at imaging positions shifted from each other in opposite directions with respect to an imaging surface on which the standard image is formed, when the photo-sensing device 120 is arranged at a position where the imaging surface on which the standard image 11b is formed matches a light-receiving surface 12 of the photo-sensing device 120 when the imaging position of the object image matches the image detection surface 2. More specifically, the first and second reference images 11a and 11c are actually detected by the photo-sensing device 120 as images in a defocus state, which are optically symmetric with respect to the standard image.

The prism assembly 8 serving as the beam splitter comprises a support member comprised of a material for transmitting the light beam from the beam splitter 3, a first semi-transparent film 8a (8d) having a predetermined transmittance and supported by the support member, the first semi-transparent film 8a (8d) separating one of the pair of reference light beams from the light beam from the beam splitter 3 as the first reference light beam and guiding the first reference light beam to the corresponding first reference optical path of the pair of reference optical paths, and a second semi-transparent film 8b (8e) having a transmittance higher than the first semi-transparent film 8a (8d) and supported by the support member while being apart from the first semi-transparent film 8a (8d) at a predetermined distance, the semi-transparent film 8b (8e) separating the standard light beam of the light beam from the first semi-transparent film 8a (8d) and guiding the standard light beam to the reference optical path.

The prism assembly 8 further comprises a reflecting film 8c (8f) for changing a travel direction of the light beam from the semi-transparent film 8b (8e) and guiding the light beam from the second semi-transparent film 8b (8e) to the corresponding second reference optical path of the pair of optical paths as the second reference light beam, thereby making the standard optical path substantially parallel to the pair of reference optical paths. The prism assembly 8 may have an arrangement for separating the light beam from the beam splitter 3 into another pair of reference light beams (including a third reference light beam and a fourth reference light beam) (FIG. 10). With this arrangement, the positional shift detection range can be increased. In these arrangements, to maintain the optical symmetry of the pair of first and second reference images 11a and 11c, which are in a defocus state, with respect to the standard image 11b the semi-transparent films 8a (8d) and 8b (8e) and the reflecting film 8c (8f) are preferably arranged at equal intervals. Therefore, the prism assembly 8 comprises, at least, a first member 81 comprised of the material for transmitting the light beam from the beam splitter 3, the first member 81 supporting the first semi-transparent film 8a (8d) on one surface of the first member 81, a second member 82 comprised of the material for transmitting the light beam from the beam splitter 3, the second member 82 having a first surface for holding the first semi-transparent film 8a (8d) together with a surface of the first member 81, and a second surface opposing the first surface of the second member 82 to support the second semi-transparent film 8b (8e), and a third member 83 comprising of the material for transmitting the light beam from the beam splitter 3, the third member 83 holding the second semi-transparent film 8c (8f) on one surface of the third member 83 together with the second surface of the second member 82.

Particularly, in a first embodiment of the prism assembly 8 shown in FIG. 2, the transmittance of the second semi-transparent film 8b is set to be higher than the first semi-transparent film 8a. With this arrangement, the reference light beams become equal to each other. On the contrary, in a second embodiment of the prism assembly shown in FIG. 3, the reflectance of the second semi-transparent film 8e is set to be higher than the first semi-transparent film 8d in order to make the reference light beams become equal to each other.

The focal position detection apparatus according to the present invention further comprises a driving system 100 for moving the objective 1 in a predetermined direction along an optical axis AX of the objective 1 (corresponding to the optical axis between the objective 1 and the image detection surface 2), and a control system 13 for calculating, on the basis of image information from the photo-sensing device 120, contrasts of the respective light beams formed at predetermined positions on the light-receiving surface 12 by the prism assembly 8. The control system 13 controls the driving system 100 in accordance with information associated with the obtained contrasts.

The focal position detection apparatus further comprises an imaging optical system 5 arranged, at a position offset from the optical axis AX of the objective 1 and the image detection surface 2, in an optical path between the prism assembly 8 and an imaging surface 4 (corresponding to an image surface conjugate to the detection surface 2) of the object image formed through the beam splitter 3. This imaging optical system constitutes an image-side telecentric system.

As described above, according to the present invention, image information of the first reference image 11a (in a first defocus state on the light-receiving surface 12 when the imaging surface on which the standard image 11b is formed matches the light-receiving surface 12) whose imaging position is present on the rear side of the imaging surface on which the standard image 11b is formed, and image information of the second reference image 11c (in a second defocus state on the light-receiving surface 12 when the imaging surface on which the standard image 11b is formed matches the light-receiving surface 12) can be obtained in addition to the image information of the standard image 11b. As a result, as will be described later, erroneous detection can be properly avoided when a large positional shift from a focus matching state is generated. The "focus matching state is a state" in which the imaging position of the image detection surface 2 matches the imaging position of the object image formed by the objective 1.

More specifically, when the amounts of the three split light beams are almost equal to each other, and the far-focus position and the near-focus position are almost optically symmetric to each other with respect to the best focus position, the contrast of the standard image 11b is maximized in the focus matching state. The contrasts of the first and second reference images 11a and 11c become almost equal to each other and substantially smaller than the contrast of the standard image 11b. When a large positional shift from the in-focus state is generated, the contrasts of both the first and second reference images 11a and 11c become small and almost equal to each other. Since the contrast relationship between the respective images in the in-focus state is largely different from that established when a large positional shift from the in-focus state is generated, erroneous detection as in the conventional apparatus can be properly avoided.

In the focal position detection apparatus according to the present invention, the imaging optical system is arranged to form the first to third images on the basis of the light beams from the object image (formed at a position offset from the optical axis AX of the objective 1) formed through the beam splitter 3. The imaging optical system is preferably an optical system almost telecentric on the image side.

In this case, no error caused by the magnification occurs between the information of the first reference image 11a and that of the second reference image 11c. Therefore, the in-focus state can be further accurately detected.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The embodiments of the present invention will be described below with reference to FIGS. 1 to 10.

Figure 1:
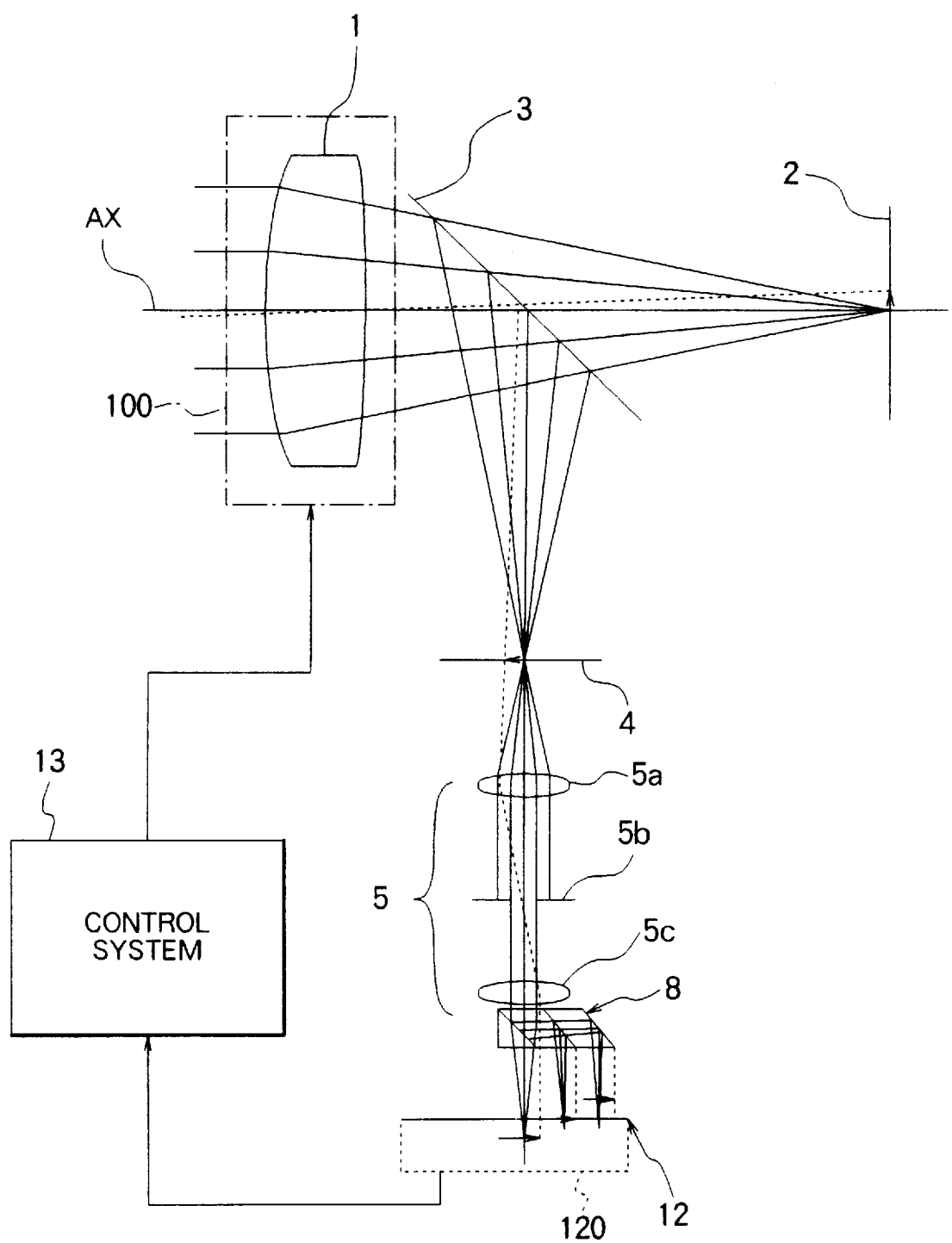
FIG. 1 is a view schematically showing the overall arrangement of a focal position detection apparatus according to the present invention.

FIG. 1 is a view schematically showing the arrangement of a focal position detection apparatus according to an embodiment of the present invention.

Referring to FIG. 1, a light beam from a distant object is guided to an objective 1. The image of the object is formed on an image detection surface 2 (image pickup surface) of an image pickup device such as a CCD, a film, or the like through the objective 1 (included in objective optical system). A beam splitter 3 serving as a first beam splitter is arranged in the optical path between the objective 1 and the image detection surface 2.

Part of the light beam passing through the objective 1 is extracted by the beam splitter 3, so that an object image is also formed on an image surface 4 optically conjugate to the detection surface 2.

The light beam from the image formed on the image surface 4 is incident on a prism assembly 8 through an imaging optical system 5. The imaging optical system 5 comprises a first relay lens 5a, an aperture stop 5b, and a second relay lens 5c. The imaging optical system 5 is an optical system telecentric on the image side because of the function of the aperture stop 5b arranged at the pupil position in the imaging optical system 5.

Figure 2:
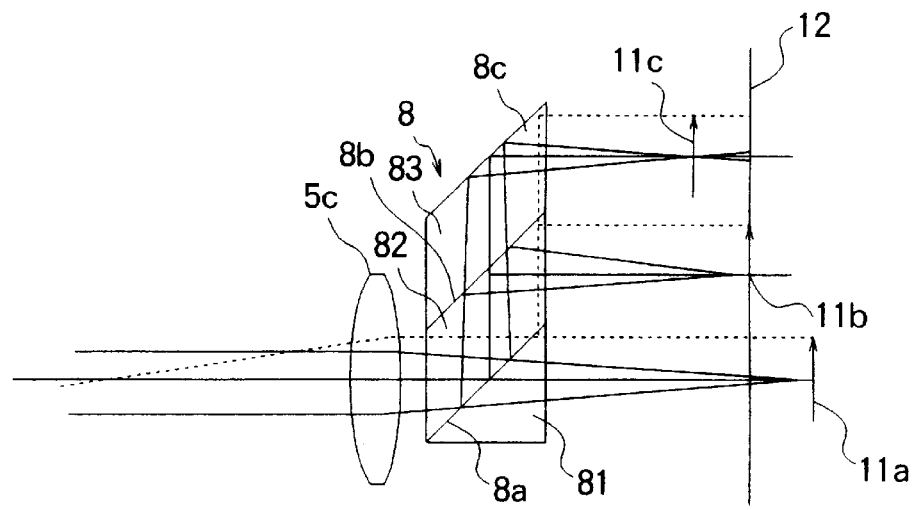
FIG. 2 is a view showing the arrangement of a first embodiment of a prism assembly (beam splitter) of the focal position detection apparatus shown in FIG. 1.

FIG. 2 is an enlarged view showing the arrangement of the prism assembly 8 (second beam splitter) of the apparatus shown in FIG. 1.

As shown in FIG. 2, the prism assembly 8 is a cemented prism constituted by bonding a rectangular prism 81 (first member) and two rhombic prisms 82 and 83 (second and third members). The prism assembly 8 has a first semi-transparent film 8a for transmitting part of the light beam incident from the second relay lens 5c in the horizontal direction of FIG. 2 and reflecting the remaining components in the vertical direction of FIG. 2. Part of the light beam from the first semi-transparent film 8a is further transmitted through a second semi-transparent film 8b, and the remaining components are reflected in the horizontal direction of FIG. 2. The light beam from the second semi-transparent film 8b is reflected in the horizontal direction of FIG. 2 through a reflecting film 8c.

More specifically, in an arrangement shown in FIG. 2, assume that the absorbance of the first to third members 81 to 83 for the light beam from the beam splitter 3 is 4%. A case wherein the light amounts of the pair of reference light beams and that of the standard light beam are set to be almost equal to each other will be described below. In this case, the transmittance and reflectance of the first semi-transparent film 8a are given as 31:65. The transmittance and reflectance of the second semi-transparent film 8b are given as 48:48. With this arrangement that the first semi-transparent film 8a having a predetermined transmittance and the second semi-transparent film 8b having a transmittance higher than that of the first semi-transparent film 8a are prepared, the light amount ratios of the first reference light beam, the standard light beam, and the second reference light beam can be equally set to be 31% with respect to the amount of the light beam incident on the prism assembly 8 consisting of a material having an absorbance of 4%.

The light beams split by the prism assembly 8 have almost equal light amounts and emerge from the prism assembly 8 in parallel to each other.

In this manner, optically independent light beams emerge from the prism assembly 8, so that a standard image 11b, a first reference image 11a, and a second reference image 11c are formed on independent optical paths.

A photo-sensing device 120 such as a line sensor is arranged at a position separated from the prism assembly 8 by a predetermined distance.

When the imaging position (focal position) of the object image formed by the objective 1 almost matches the detection surface 2 along an optical axis AX of the objective 1, i.e., in a focus matching state, which is defined as a state that the imaging position of the object image formed by the objective 1 matches the image detection surface 2, the imaging position of the first reference image 11a is present on the rear side of a light-receiving surface 12 (a first defocus state on the light-receiving surface 12). The standard image 11b is in a best focus state on the light-receiving surface 12. This matter means that the imaging surface on which the standard image 11b is formed corresponds to the light-receiving surface 12. The imaging position of the second reference image 11c is present in front of the light-receiving surface 12 and in a second defocus state as optically opposed to the first defocus state. The respective reference images are detected by the line sensor 120.

Figure 3:
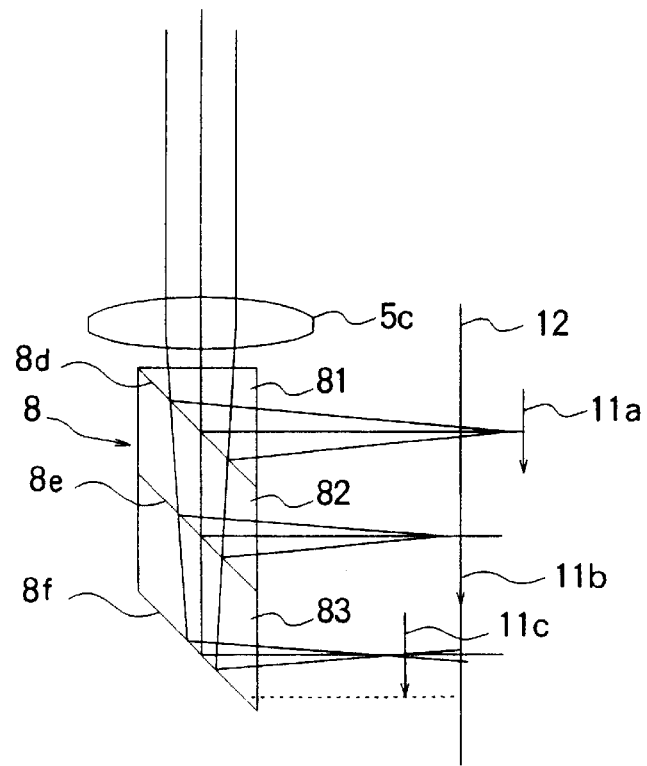
FIG. 3 is a view showing the arrangement of a second embodiment of the prism assembly (beam splitter) of the focal position detection apparatus shown in FIG. 1.

FIG. 3 is an enlarged view showing the arrangement of a modification of the prism assembly 8 of the apparatus shown in FIG. 1.

As shown in FIG. 3, the prism assembly 8 is a cemented prism constituted by bonding the first rectangular prism 81 (first member) and the two rhombic prisms 82 and 83 (second and third members). The prism assembly 8 has a first semi-transparent film 8d for transmitting part of the light beam incident from the second relay lens 5c in the vertical direction of FIG. 3 and reflecting the remaining components in the horizontal direction of FIG. 3. Part of the light beam from the first semi-transparent film 8d is further transmitted through a second semi-transparent film 8e, and the remaining components are reflected in the horizontal direction of FIG. 3. The light beam from the second semi-transparent film 8e is reflected in the horizontal direction of FIG. 3 through a reflecting film 8f.

The respective light beams split by the prism assembly 8 shown in FIG. 3 also have almost equal light amounts and emerge from the prism assembly 8 parallel to each other. In the modification shown in FIG. 3, optically independent light beams emerge from the prism assembly 8, so that the standard image 11b and the first and second reference images 11a and 11c are formed in the respective optical paths.

More specifically, in an arrangement shown in FIG. 3, assume that the absorbance of the first to third members 81 to 83 for the light beam from the beam splitter 3 is 4%. A case wherein the light amounts of the pair of reference light beams and that of the standard light beam are set to be almost equal to each other will be described below. In this case, the transmittance and reflectance of the first semi-transparent film 8d are given as 65:31. The transmittance and reflectance of the second semi-transparent film 8e are given as 48:48. With this arrangement that the first semi-transparent film 8d having a predetermined reflectance and the second semi-transparent film 8e having a reflectance higher than that of the first semi-transparent film 8e are prepared, the light amount ratios of the first reference light beam, the standard light beam, and the second reference light beam can be equally set to be 31% with respect to the amount of the light beam incident on the prism assembly 8 consisting of a material having an absorbance of 4%.

Figure 4:
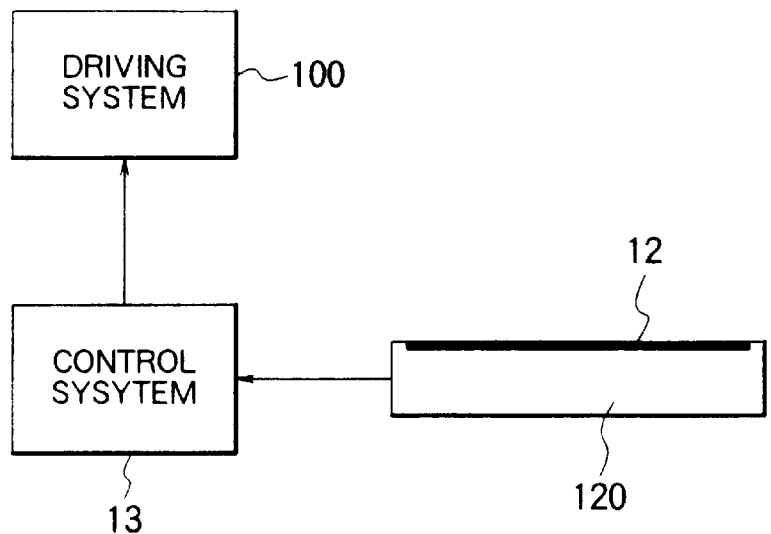
FIG. 4 is a block diagram showing the arrangement of a section for executing a control operation for the focal position detection apparatus shown in FIG. 1.

Driving control of the objective 1 will be described below. In this driving control, a control system 13 calculates a contrast on the basis of a detection signal from the line sensor 120. A driving system 100 for moving the objective 1 along the optical axis AX in accordance with the obtained contrast is controlled, as shown in FIG. 4. Each contrast shown in FIG. 5 is represented as an integration value obtained by differentiating (difference calculation) light intensity information from the line sensor 120 to obtain the gradient of the light intensity and further integrating this differential coefficient within the detection range of each image.

Figure 5:
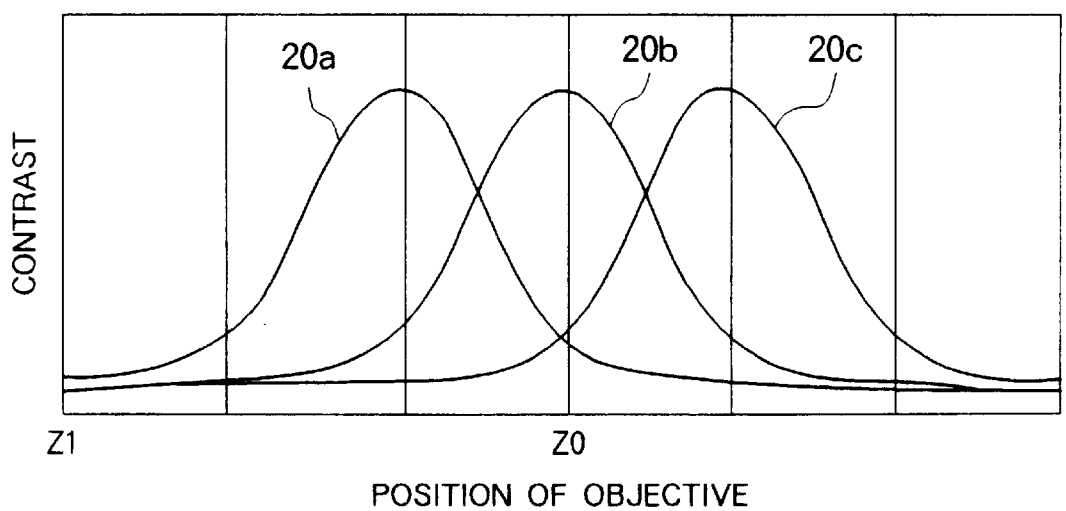
FIG. 5 is a graph showing the contrast amounts of a standard image 11b and a pair of reference images 11a and 11c with respect to a change in position of an objective 1 along an optical axis AX of the objective optical system (including objective 1) in the focal position detection apparatus shown in FIG. 1.

FIG. 5 is a graph showing contrast curves associated with the standard image 11b, the first reference image 11a and the second reference image 11c with respect to a change in position of the objective 1 along the optical axis AX in the apparatus shown in FIG. 1.

As shown in FIG. 5, when the objective 1 is at a focus matching position Z0 (corresponding to the position of the objective 1 in the focus matching state), a contrast associated with the first reference image 11a in the first defocus state on the light-receiving surface 12 and a contrast associated with the second reference image 11c in the second defocus state on the light-receiving surface 12 are almost equal to each other. In addition, the contrast of the standard image 11b in the best focus state on the light-receiving surface 12 is maximized to be substantially larger than the contrasts of the first reference image 11a and the second reference image 11c. In FIG. 5, 20a indicates a contrast curve associated with the first reference image 11a. 20b indicates a contrast curve associated with the standard image 11b. And, 20c indicates a contrast curve associated with the second reference image 11c. The contrast curves 20a to 20c in FIG. 5 represent the contrasts (integration values within the respective detection ranges) of the respective images with respect to the position of the object 1.

An output from the line sensor 120 is supplied to the control system 13. The control system 13 controls the driving system 100, based on the image information from the line sensor 120, to appropriately drive the objective 1 along the optical axis AX, thereby matching (focusing) the imaging surface of the objective 1 with the image detection surface 2.

In this embodiment, in the focus matching state, the contrast associated with the standard image 11b in the best focus state on the light-receiving surface 12 is maximized, and the contrasts associated with the first reference image 11a and the second reference image 11c, which are in the first and second defocus states on the light-receiving surface 12, become almost equal to each other and substantially smaller than the contrast of the standard image 11b.

When the objective 1 is at a position Z1 shifted by a large amount from the focus matching position Z0, all the contrasts of the standard image 11b and the first and second reference images 11a and 11c become small and almost equal to each other. Since the contrast relationship between the respective images in the focus matching state is largely different from that established when a large positional shift from the focus matching state is generated, erroneous detection can be properly avoided.

The control operation will be described below in detail. A focal position detection sequence (to be referred to as a detection sequence hereinafter) is executed by the control system 13 in accordance with the flow chart shown in FIG. 6, so that the current focal position of the objective 1 is specified by the control system 13. Subsequently, a focusing speed control sequence (to be referred to as a driving sequence hereinafter) is executed in accordance with the flow chart shown in FIG. 7. This driving sequence is executed when the driving system 100 moves the objective 1 in a desired direction along the optical axis AX of the objective 1 in accordance with the control information from the control system 13. The control system 13 in which the driving sequence is executed immediately executes the detection sequence again, thereby detecting the focal position of the moved objective 1. Normally, the detection sequence and the driving sequence are sequentially repeated to match the focal position of the objective 1 with the detection surface 2 of the image pickup device. The completion condition for this control operation is as follows. In the pair of reference optical paths, the difference between the integration value associated with the first reference image 11a in the first defocus state (a state wherein the focal position where the first reference image 11a is formed is positioned on the rear side of the light-receiving surface 12) and the integration value associated with the second reference image 11c in the second defocus state (a state wherein the focal position where the second reference image 11c is formed is positioned in front of the light-receiving surface 12), which defocus states are detected by the line sensor 120, becomes smaller than an integration value width which defines determination condition (allowable focal depth) for the focus matching state.

Figure 6:
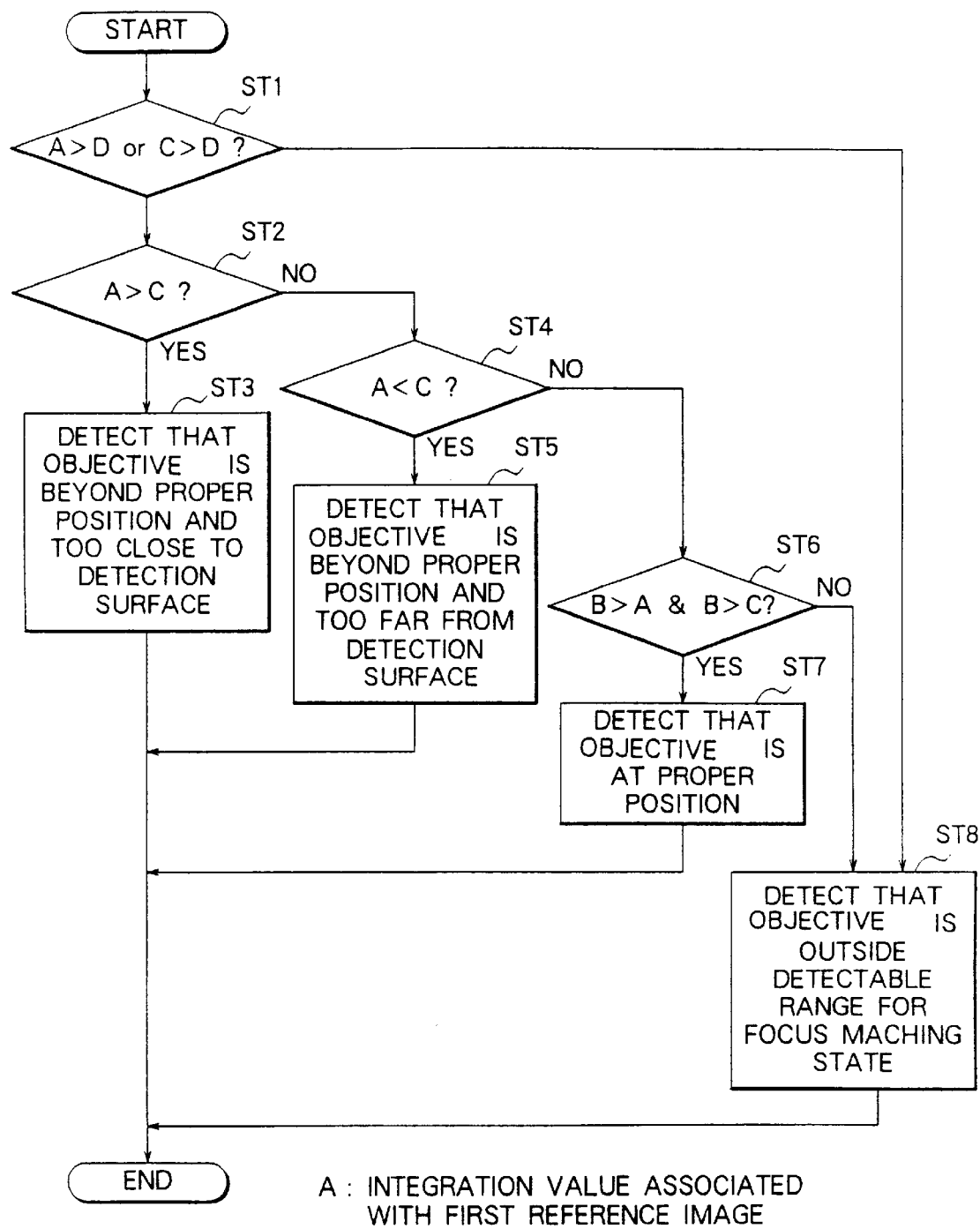
FIG. 6 is a flow chart for explaining a first control algorithm (focal position detection sequence) of the focal position detection apparatus according to the present invention.

In the detection sequence, as shown in the flow chart of FIG. 6, it is confirmed first that an integration value A associated with the first reference image 11a and an integration value C associated with the second reference image 11c are larger than a value D which defines the lower limit of the integration values (step ST1). When the integration values A and C are smaller than the lower limit value D, it is determined that the position of the objective 1 is shifted by a large amount from the proper position Z0 (step ST8). That is, the lower limit value D defines the substantial detectable range for the focus matching state in the detection sequence.

When it is determined that the integration values A and C are larger than the lower limit value D, the integration values are compared with each other to specify the current position of the objective 1 (corresponding to the focal position of the objective 1 with respect to the detection surface 12). More specifically, when the integration value A associated with the first reference image 11a is larger than the integration value C associated with the second reference image 11c (step ST2), the position of the objective 1 is beyond the proper position Z0 and is too far from the detection surface 2 (step ST3). When the integration value A associated with the first reference image 11a is smaller than the integration value C associated with the second reference image 11c (step ST4), the position of the objective 1 is beyond the proper position Z0 and is too close to the image detection surface 2 (step ST5). On the other hand, when the integration values A and C are equal to each other, the integration values A and C are compared with an integration value B associated with the standard image 11b (step ST6). When the integration values A and c are smaller than the integration value B associated with the standard image 11b, the objective 1 is present at the proper position Z0 (step ST7). Inversely, when the integration values A and C are larger than the integration value B associated with the standard image 11b, the objective 1 is positioned within the in-focus state detectable range for the focus matching state (step ST8).

Figure 7:
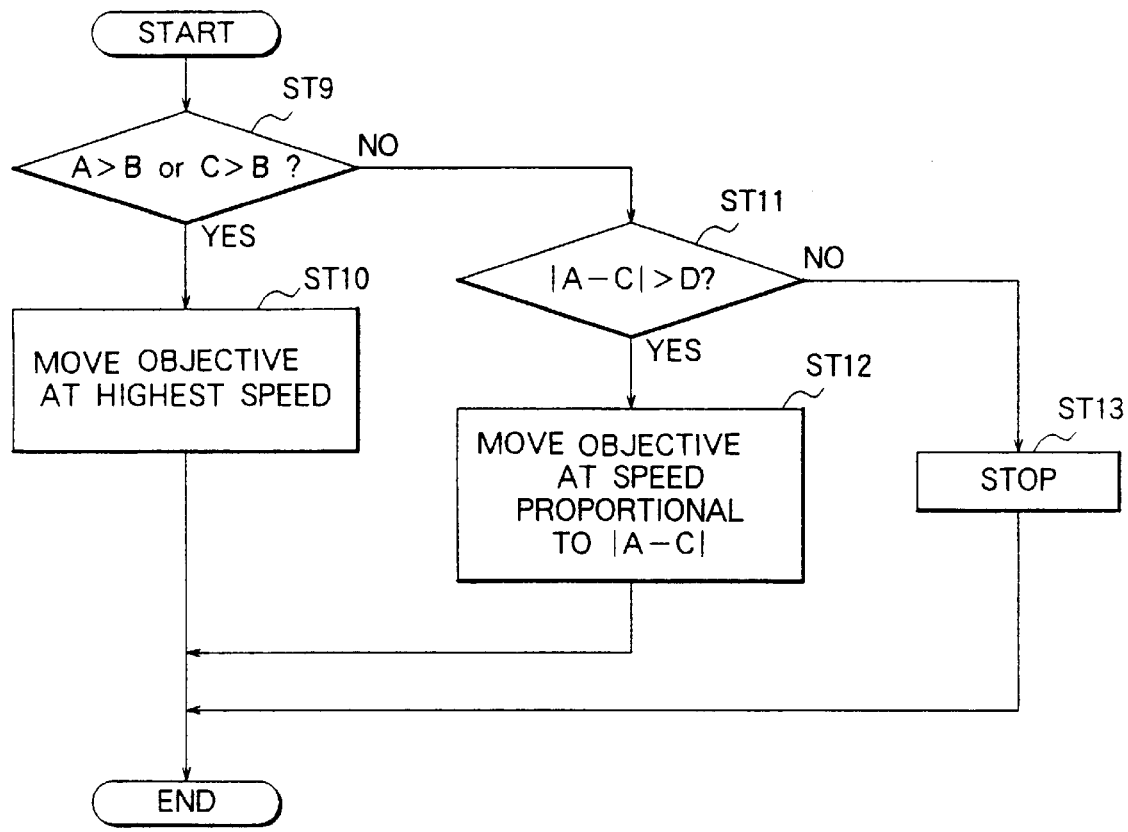
FIG. 7 is a flow chart for explaining a second control algorithm (focusing speed control sequence) of the focal position detection apparatus according to the present invention.

The driving sequence is executed when the control system 13 controls the driving system 100 in correspondence with the set state of the objective 1, which has been specified in the above detection sequence, as shown in the flow chart of FIG. 7.

More specifically, when the integration value A associated with the first reference image 11a is larger than the integration value B associated with the standard image 11b, or when the integration value C associated with the second reference image 11c is larger than the integration value B associated with the standard image 11b (step ST9), the control system 13 designates the driving system 100 to move the objective 1 at the highest speed (step ST10). The direction to which the objective 1 is moved is determined on the basis of the state specified in the detection sequence.

When at least one of the integration values A and C is smaller than the integration value B, an absolute value |A−C| of the difference between the integration value A and the integration value C is compared with the integration value width D (completion condition) which defines the determination condition (allowable focal depth) for the focus matching state (step ST11). When the absolute value |A−C| of the difference is larger than the completion condition value D, the control system 13 designates the driving system 100 to move the objective 1 at a speed proportional to the absolute value |A−C| of the difference (step ST12). At this time, the direction to which the objective 1 is moved is determined on the basis of the sign of the difference between the integration value A and the integration value C. When it is determined that the absolute value |A−C| of the difference is smaller than the completion condition value D, it is determined that the imaging position of the objective 1 and the image detection surface 2 are in the focus matching state, so that the control system 13 designates the driving system 100 to stop moving the objective 1 from moving (step ST13).

To explain the effect of the focal position detection apparatus according to the present invention, a comparative example is described below.

Figure 8:
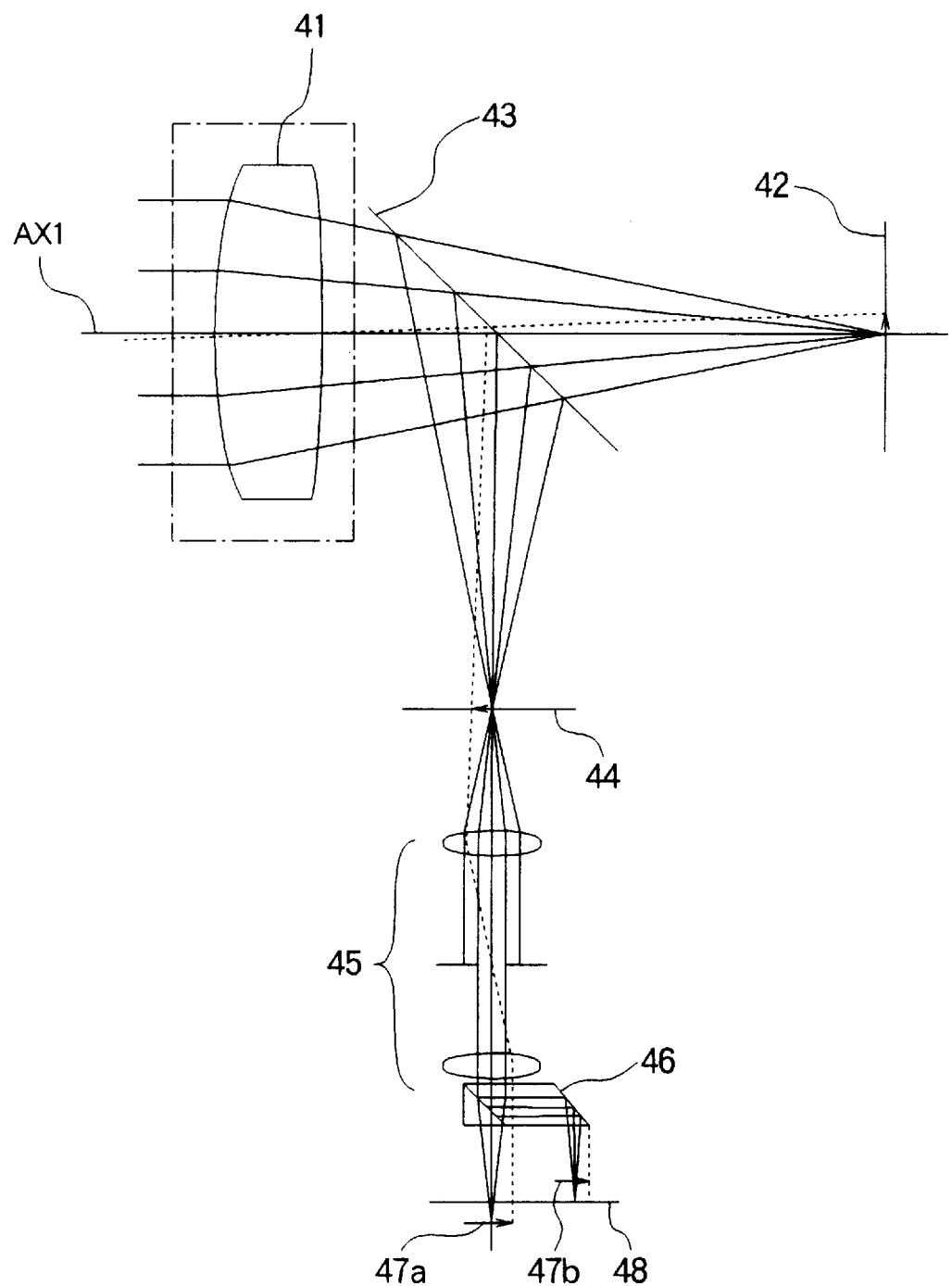
FIG. 8 is a view schematically showing the arrangement of a comparative example of the focal position detection apparatus according to the present invention.

FIG. 8 is a view schematically showing the arrangement of a comparative example of the focal position detection apparatus according to the present invention.

Referring to FIG. 8, a light beam from a distant object passes through an objective 41. The image of the object is formed on an image detection surface 42 (image pickup surface) of an image pickup device such as a CCD, a film, or the like through the objective 41. A beam splitter 43 is arranged in the optical path between the objective 41 and the image detection surface 42. Part of the light beam passing through the objective 41 is extracted by the beam splitter 43, so that an object image is formed on an image plane 44 optically conjugate to the detection surface 42.

The light beam from the object image formed on the image surface 44 is incident on a prism assembly 46 through an imaging optical system 45. The prism assembly 46 splits the incident light beam into two light beams to form a first image 47a and a second image 47b in the respective optical paths. A light-receiving device such as a line sensor is arranged between the imaging position of the first image 47a and that of the second image 47b.

In FIG. 8, the imaging position of the first image 47a is present on the rear side of a light-receiving surface 48, and the imaging position of the second image 47b is present in front of the light-receiving surface 48. Therefore, these images are detected by the line sensor as images in predetermined defocus states.

Figure 9:
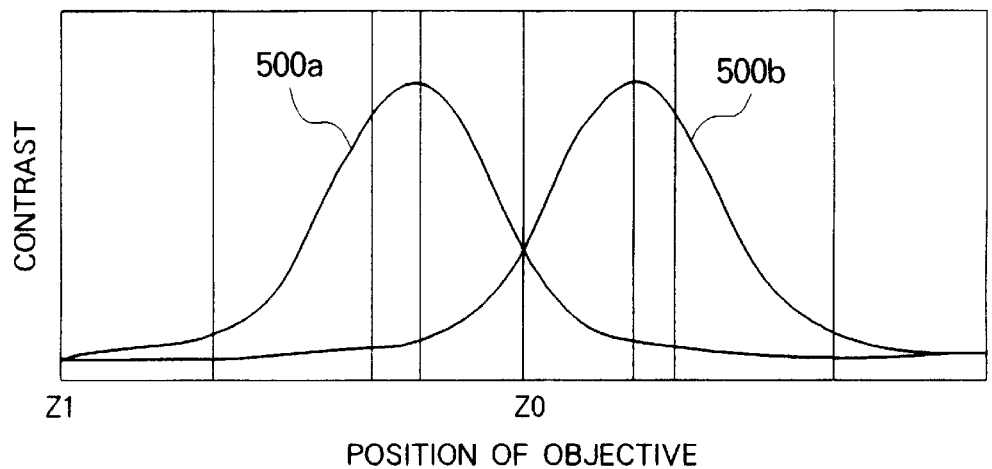
FIG. 9 is a graph showing the contrasts of a plurality of images 47a and 47b with respect to a change in position of an objective 41 along the optical axis AX of the objective optical system (including objective 41) in the comparative example shown in FIG. 8.

FIG. 9 is a graph showing the contrast curves (corresponding to integration values at the respective positions of the objective 41 within the image detection range) of the first and second images 47a and 47b with respect to a change in position of the objective 41 shown in FIG. 8.

In the focal position detection apparatus shown in FIG. 8, when the objective 41 is positioned at the proper position Z0 such that the contrast associated with the image 47a and the contrast associated with the image 47b become almost equal to each other, as shown in FIG. 9, the imaging surface of the objective 41 almost matches the image detection surface 42 of the image pickup device.

In the focal position detection apparatus shown in FIG. 8, however, when the contrast associated with the first image 47a is equal to that associated with the second image 47b on the light-receiving surface 48 of the line sensor, a focus matching state is determined. In this case, even when the objective 41 is present at, e.g., the position Z1, and the imaging surface of the objective 41 is largely shifted from the image detection surface 42 of the image pickup device, the contrasts associated with the first and second images 47a and 47b become almost equal to each other, though both the contrasts are small.

Even when a large positional shift from the focus matching state is generated, the focal position detection apparatus shown in FIG. 8 sometimes erroneously detects a focus matching state as far as the contrasts associated with the two images are almost equal to each other.

On the other hand, the focal position detection apparatus according to the present invention has an arrangement for avoiding the probability of such erroneous detection.

In this embodiment, the imaging optical system 5 is constituted as an optical system telecentric on the image side. Therefore, the focus matching state is detected without generating any magnification error between the image information of the first image 47a and that of the second image 47b.

In the above embodiment, a line sensor is used as the image detection means. However, the detection means is not limited to the line sensor, and other detection means can also be used.

Figure 10:
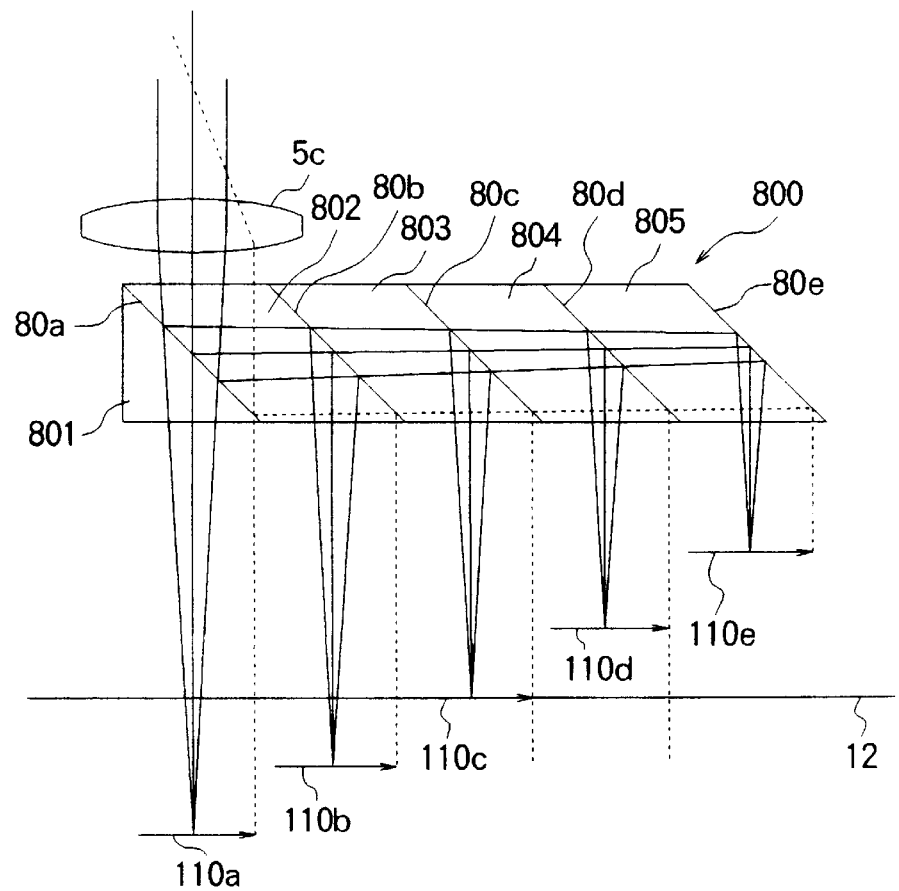
FIG. 10 is a view showing the arrangement of an application of the prism assembly of the focal position detection apparatus according to the present invention.

FIG. 10 is a view showing the second modification of the prism assembly of the apparatus shown in FIG. 1.

A prism assembly 800 shown in FIG. 10 is constituted by support members 801 through 805 comprising of a material for transmitting the light beam from the beam splitter 3, semi-transparent films 80a through 80d, and a reflecting film 80e. With this prism assembly 800, a first pair of reference images (including a first reference image 110b and a second reference image 110d) and a second pair of reference images (including a third reference image 110a and a fourth reference image 110e) are formed at predetermined imaging positions together with a standard image 110c. When the imaging surface on which the standard image 110c is formed matches the light-receiving surface 12 of the line sensor 120, the first and second reference images 110b and 110d are set in different defocus states on the light-receiving surface 12 while being optically symmetric to each other with respect to the standard image 110c. Similarly, the third and fourth reference images 110a and 110e are set in different defocus states on the light-receiving surface 12 while being optically symmetric to each other with respect to the standard image 110c. In this manner, when the prism assembly 800 with a larger number of pairs of reference light beams is applied to the apparatus shown in FIG. 1, the detectable range for the focus matching state in this apparatus can be further increased.

It is noted here that the present invention is by no means limited to the embodiments as described above but may have a variety of modifications. For example, in each embodiment, the objective 1 is constituted by a refractive optical element (lens). However, instead of this refractive element, reflective optical element such as a mirror, or a combination of the refractive and reflective optical elements may be used for the objective 1. Such modifications also enjoy substantially the same operational effects as each of the embodiments described above.

As has been described above, according to the present invention, image information associated with at least one pair of reference images in a defocus state, which are symmetrical to each other with respect to the standard image, can be obtained in addition to information associated with the standard image in a predetermined focus state on the light-receiving surface. Therefore, according to this apparatus, even when a large positional shift from the in-focus state is generated, erroneous detection as described above can be properly avoided.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No.222678/1995 filed on Aug. 8, 1995 is incorporated herein by reference.

What is claimed is:

1. A focal position detection apparatus for detecting a positional shift between an imaging position of an object image formed by an objective optical system and an image detection surface of the object image, said apparatus comprising:

a first beam splitter arranged in an optical path between said objective optical system and said detection surface to extract part of a light beam from said objective optical system;

a photo-sensing device for detecting a light beam extracted by said first beam splitter; and a second beam splitter for splitting the light beam extracted by said first beam splitter into three light beams and guiding said three light beams to a light-receiving surface of said photo-sensing device along different optical paths, said second beam splitter including:

a support member comprised of a material for transmitting the light beam from said first beam splitter;

a first semi-transparent film having a predetermined transmittance and supported by said support member, said first semi-transparent film reflecting part of the light beam from said first beam splitter to split the light beam from said first beam splitter; and a second semi-transparent film having a transmittance higher than said first semi-transparent film and supported by said support member while being separated from said first semi-transparent film by a predetermined distance, said second semi-transparent film reflecting part of one of the light beams split by said first semi-transparent film to split the light beam from said first semi-transparent film.

2. An apparatus according to claim 1, wherein said support member comprises:

a first member comprised of said material for transmitting the light beam from said first beam splitter, said first member supporting said first semi-transparent film on one surface of said first member;

a second member comprised of said material for transmitting the light beam from said first beam splitter, said second member having a first surface for holding said first semi-transparent film together with said one surface of said first member, and a second surface opposing said first surface of said second member to support said second semi-transparent film; and a third member comprised of said material for transmitting the light beam from said first beam splitter, said third member holding said second semi-transparent film on one surface of said third member together with said second surface of said second member.

3. An apparatus according to claim 2, wherein said second beam splitter further comprises a reflecting film for changing a travel direction of one of the light beams separated by said second semi-transparent film.

4. An apparatus according to claim 1, further comprising:

a driving system for moving said objective optical system in a predetermined direction along an optical axis of said objective optical system; and a control system for calculating, based on information from said photo-sensing device, contrasts of the respective light beams split by said second beam splitter and controlling said driving system in accordance with information associated with the obtained contrasts.

5. An apparatus according to claim 1, further comprising an imaging optical system arranged, at a position offset from said optical axis between said objective optical system and said image detection surface, in an optical path between an imaging surface of the object image formed through said first beam splitter and said second beam splitter.

6. An apparatus according to claim 5, wherein said imaging optical system constitutes an image-side telecentric system.

7. An apparatus according to claim 3, further comprising:

a driving system for moving said objective optical system in a predetermined direction along an optical axis of said objective optical system; and a control system for calculating, based on information from said photo-sensing device, contrasts of the respective light beams split by said second beam splitter and controlling said driving system in accordance with information associated with the obtained contrasts.

8. An apparatus according to claim 7, further comprising an imaging optical system arranged, at a position offset from said optical axis between said objective optical system and said image detection surface, in an optical path between an imaging surface of the object image formed through said first beam splitter and said second beam splitter.

9. An apparatus according to claim 8, wherein said imaging optical system constitutes an image-side telecentric system.

10. A focal position detection apparatus for detecting a positional shift between an imaging position of an object image formed by an objective optical system and an image detection surface of the object image, said apparatus comprising:

a first beam splitter arranged in an optical path between said objective optical system and said detection surface to extract part of a light beam from said objective optical system;

a photo-sensing device for detecting a light beam extracted by said first beam splitter; and a second beam splitter for splitting the light beam extracted by said first beam splitter into three light beams and guiding said three light beams to a light-receiving surface of said photo-sensing device along different optical paths, said second beam splitter including:

a support member comprised of a material for transmitting the light beam from said first beam splitter;

a first semi-transparent film having a predetermined reflectance and supported by said support member, said first semi-transparent film transmitting part of the light beam from said first beam splitter to split the light beam from said first beam splitter; and a second semi-transparent film having a reflectance higher than said first semi-transparent film and supported by said support member while being separated from said first semi-transparent film by a predetermined distance, said second semi-transparent film transmitting part of one of the light beams split by said first semi-transparent film to split the light beam from said first semi-transparent film.

11. An apparatus according to claim 10, wherein said support member comprises:

a first member comprised of said material for transmitting the light beam from said first beam splitter, said first member supporting said first semi-transparent film on one surface of said first member;

a second member comprised of said material for transmitting the light beam from said first beam splitter, said second member having a first surface for holding said first semi-transparent film together with said one surface of said first member, and a second surface opposing said first surface of said second member to support said second semi-transparent film; and a third member comprised of said material for transmitting the light beam from said first beam splitter, said third member holding said second semi-transparent film on one surface of said third member together with said second surface of said second member.

12. An apparatus according to claim 11, wherein said second beam splitter further comprises a reflecting film for changing a travel direction of one of the light beams separated by said second semi-transparent film.

13. An apparatus according to claim 10, further comprising:

a driving system for moving said objective optical system in a predetermined direction along an optical axis of said objective optical system; and a control system for calculating, based on information from said photo-sensing device, contrasts of the respective light beams split by said second beam splitter and controlling said driving system in accordance with information associated with the obtained contrasts.

14. An apparatus according to claim 10, further comprising an imaging optical system arranged, at a position offset from said optical axis between said objective optical system and said image detection surface, in an optical path between an imaging surface of the object image formed through said first beam splitter and said second beam splitter.

15. An apparatus according to claim 14, wherein said imaging optical system constitutes an image-side telecentric system.

16. An apparatus according to claim 12, further comprising:

a driving system for moving said objective optical system in a predetermined direction along an optical axis of said objective optical system; and a control system for calculating, based on information from said photo-sensing device, contrasts of the respective light beams split by said second beam splitter and controlling said driving system in accordance with information associated with the obtained contrasts.

17. An apparatus according to claim 16, further comprising an imaging optical system arranged, at a position offset from said optical axis between said objective optical system and said image detection surface, in an optical path between an imaging surface of the object image formed through said first beam splitter and said second beam splitter.

18. An apparatus according to claim 17, wherein said imaging optical system constitutes an image-side telecentric system.

19. A focal position detection apparatus for detecting a positional shift between an imaging position of an object image to be formed by an objective optical system and an image detection surface of the object image, said apparatus comprising:

a first beam splitter arranged in an optical path between said objective optical system and said detection surface to extract part of a light beam from said objective optical system;

a photo-sensing device for detecting a light beam extracted by said first beam splitter; and a second beam splitter for splitting the light beam extracted by said first beam splitter into a standard light beam and at least first and second reference light beams and guiding the standard light beam and the first and second reference light beams to a light-receiving surface of said photo-sensing device, said second beam splitter defining a standard optical path through which the standard light beam travels and first and second reference optical paths through which the first and second reference light beams travel, respectively, and forming a standard image at a predetermined position in the standard optical path and first and second reference images at predetermined positions in the first and second reference optical paths, respectively, the first and second reference images being formed at imaging positions shifted from each other in opposite directions with respect to an imaging surface on which the standard image is formed, wherein said photo-sensing device is arranged at a position where the imaging surface on which the standard image is formed matches said light-receiving surface of said photo-sensing device when the imaging position of said object image matches said detection surface.

20. An apparatus according to claim 19, wherein said second beam splitter comprises:

a support member comprised of a material for transmitting the light beam from said first beam splitter;

a first semi-transparent film having a predetermined transmittance and supported by said support member, said first semi-transparent film separating one of the first and second reference light beams from the light beam from said first beam splitter and guiding the one of the first and second reference light beams to a corresponding one of the first and second reference optical paths; and a second semi-transparent film having a transmittance higher than that of said first semi-transparent film and supported by said support member while being separated from said first semi-transparent film by a predetermined distance, said semi-transparent film separating the standard light beam from the light beam from said first semi-transparent film and guiding the standard light beam to the standard optical path.

21. An apparatus according to claim 20, wherein said second beam splitter further comprises a reflecting film for changing a travel direction of the light beam from said second semi-transparent film and guiding, as the other of the first and second reference light beams, the light beam from said second semi-transparent film to the other corresponding optical path of the first and second reference optical paths.

22. An apparatus according to claim 19, further comprising:
   a driving system for moving said objective optical system in a predetermined direction along an optical axis of said objective optical system; and
   a control system for calculating, on the basis of image information from said photo-sensing device, contrasts of the respective images formed on said light-receiving surface and controlling said driving system in accordance with information associated with the obtained contrasts.

23. An apparatus according to claim 19, further comprising an imaging optical system arranged, at a position offset from an optical axis between said objective optical system and said image detection surface, in an optical path between an imaging surface of the object image formed through said first beam splitter and said second beam splitter.

24. An apparatus according to claim 23, wherein said imaging optical system constitutes an image-side telecentric system.

25. An apparatus according to claim 19, wherein said second beam splitter comprises:
   a support member comprised of a material for transmitting the light beam from said first beam splitter;
   a first semi-transparent film having a predetermined reflectance and supported by said support member, said first semi-transparent film separating one of the first and second reference light beams from the light beam from said first beam splitter and guiding the one of the first and second reference light beams to a corresponding one of the first and second reference optical paths; and
   a second semi-transparent film having a reflectance higher than that of said first semi-transparent film and supported by said support member while being separated from said first semi-transparent film by a predetermined distance, said semi-transparent film separating the standard light beam from the light beam from said first semi-transparent film and guiding the standard light beam to the standard optical path.

26. An apparatus according to claim 25, wherein said second beam splitter further comprises a reflecting film for changing a travel direction of the light beam from said second semi-transparent film and guiding, as the other of the first and second reference light beams, the light beam from said second semi-transparent film to the other corresponding optical path of the first and second reference optical paths.

* * * * *